United States Patent [19]

Mizoguchi

[11] Patent Number: 4,991,828
[45] Date of Patent: Feb. 12, 1991

[54] DOCUMENT FEEDING APPARATUS

[75] Inventor: Motoshi Mizoguchi, Yokohama, Japan

[73] Assignee: Ricoh Company, Ltd., Tokyo, Japan

[21] Appl. No.: 301,060

[22] Filed: Jan. 25, 1989

[30] Foreign Application Priority Data

Jan. 25, 1988 [JP] Japan .................................. 63-7049

[51] Int. Cl.[5] .............................................. B65H 5/06
[52] U.S. Cl. ........................................ 271/3; 271/114; 271/246
[58] Field of Search ............................ 271/3, 114, 246

[56] References Cited

U.S. PATENT DOCUMENTS 3,575,410  4/1971  Suzuki ............................. 271/114 X
4,171,128 10/1979  Irvine ..................................... 271/3

Primary Examiner—Richard A. Schacher
Attorney, Agent, or Firm—Oblon, Spivak, McClelland, Maier & Neustadt

[57] ABSTRACT

An automatic document feeding apparatus suitable for use in a facsimile machine includes a document feed roller for feeding a document to be read into an image reading section and a document discharging roller for discharging the document from the image reading section. An electromagnetic clutch is provided in the document discharging roller so that the document discharging roller may be operatively decoupled from a drive train to be set in a free condition temporarily during a time period in which a transmission completion protocol procedure and a stamping operation are to be carried out.

2 Claims, 3 Drawing Sheets

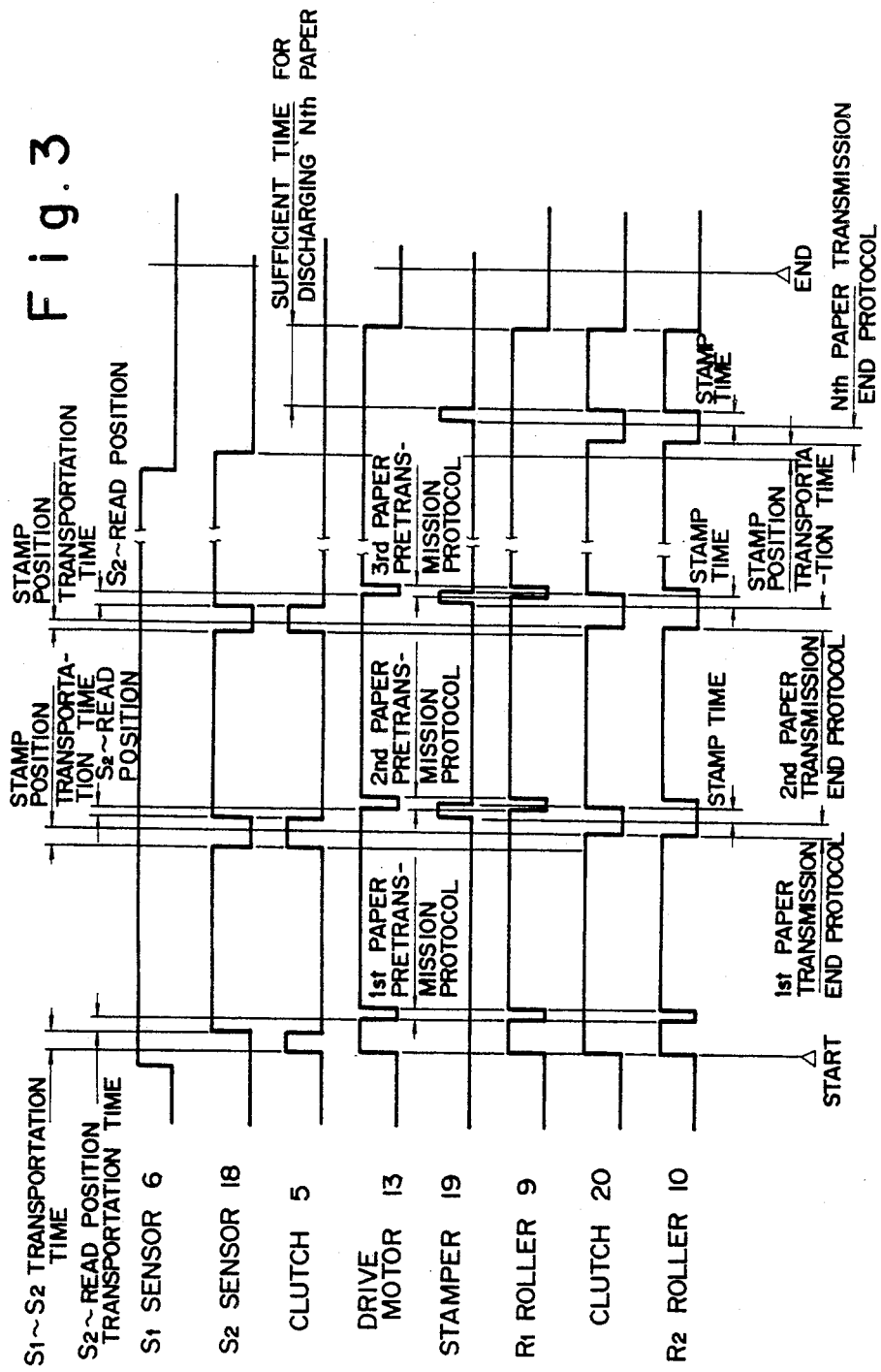

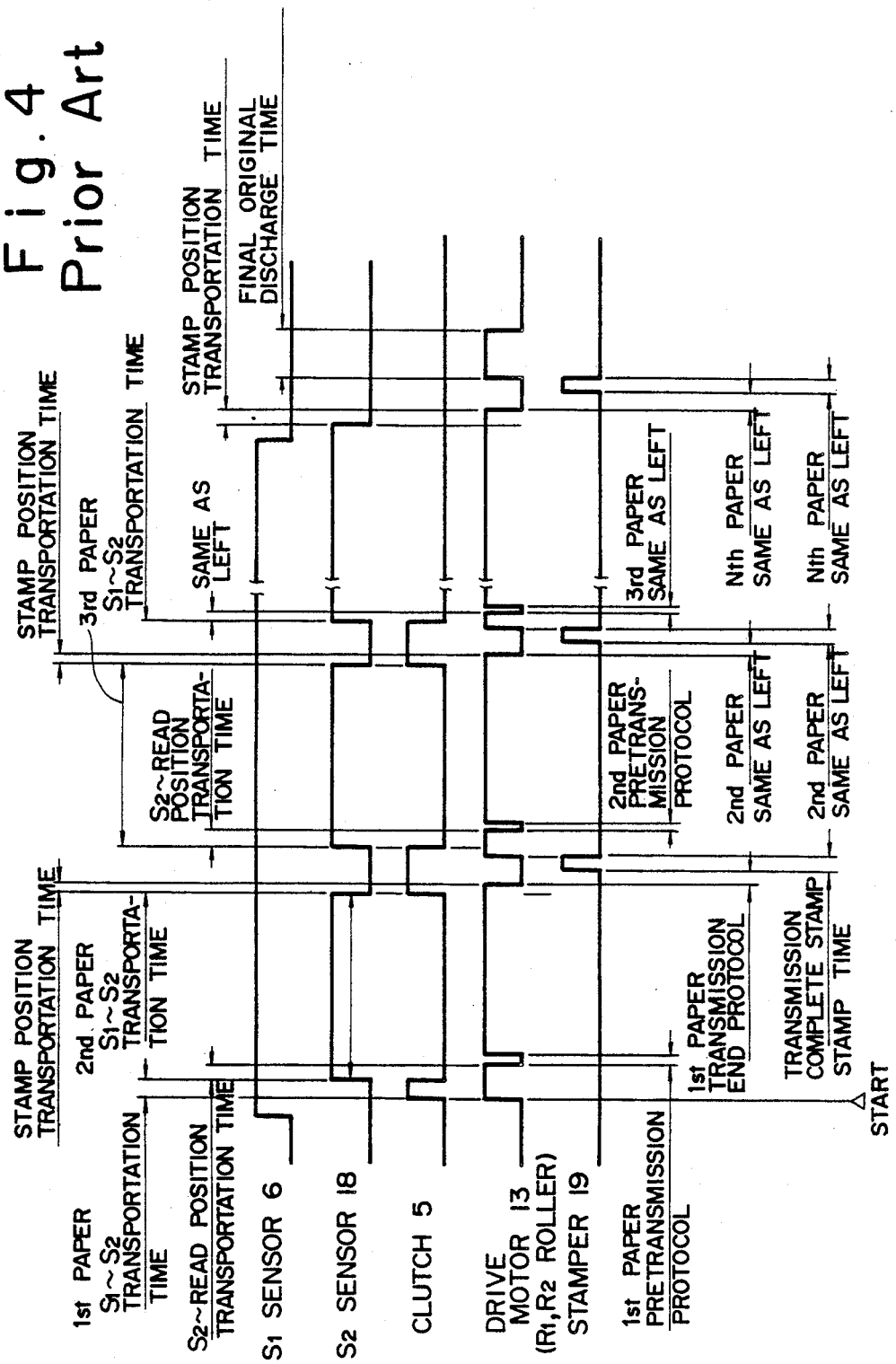

DOCUMENT FEEDING APPARATUS

BACKGROUND OF THE INVENTION

1. Field of the Invention

This invention generally relates to an apparatus for feeding documents, such as original documents, through a reading section for reading an image on a document, and, in particular, to a document feeding apparatus particularly suitable for use in facsimile machines, copying machines and the like.

2. Description of the Prior Art

An automatic document feeding apparatus is used in various office machines, and, in particular, in facsimile machines. A typical prior art document feeding apparatus incorporated in a facsimile machine is illustrated in FIG. 2. As shown, the document feeding apparatus includes a pick-up roller 1, a separating roller 2 and a feed roller 3, which together define a document feeding section for feeding original documents 4 one by one. An electromagnetic clutch 5 is mounted on a shaft of the feed roller 3 and a document sensor 6 is provided for sensing the presence or absence of documents. A pair of guide plates 7 and 8 is provided for defining a transportation path for transporting an original document through a reading section. Thus, the original documents 4 are transported along this transportation path one by one when fed.

Transportation rollers 9 and 10 are provided spaced apart from each other along the document transportation path. The roller 9 is located at the entrance to a reading section for reading an image of each of the original documents 4 and the roller 10 is located at the exit of such a reading section. Pressure rollers 11 and 12 are also provided to be in pressure contact with the respective rollers 9 and 10. A drive motor 13 is also provided and its power is transmitted to a follower pulley 14 through an endless belt 15. The follower pulley 14 is also operatively associated with the rollers 9 and 10 through an endless belt 16, so that the power transmitted from the drive motor 13 through the endless belt 15 is in turn transmitted to each of the rollers 9 and 10 through the endless belt 16.

A contact glass 17 is disposed in the reading section of the document feeding apparatus, and each of the original documents 4 moves in contact with the contact glass 17 when transported through the reading section, whereby the image on each of the original documents 4 is optically read, typically by a scanning method. A document detector 18 is also provided between the roller 9 and the contact glass 17 and a stamper 19 for providing a stamped mark on each of the original documents 4 to indicate the fact that original documents have been optically read.

The operation of the above-described document feeding apparatus will now be described with reference to a timing chart shown in FIG. 4.

(1) In the first place, when a start key (not shown) is depressed by the operator while original documents 4 have been detected to be set by the sensor 6, the drive motor 13 is activated and the clutch 5 is energized so that the pick-up roller 1 and the feed roller 3 start to rotate and at the same time the bottom-most sheet of original document 4 is separated from the stack of original documents 4 by the separating roller 2 and fed.

(2) When the leading edge of the original document 4 thus fed is detected by the sensor 18 after it has moved past the roller 9, the clutch 5 is deenergized so that the feed roller 3 is set in a freely rotatable state, thereby serving as a follower roller. When the leading edge of the original document 4 has reached the reading position, the drive motor 13 is temporarily deactivated and thus the entire drive system is brought to a halt to thereby set a stand-by condition.

(3) Upon receipt of a confirmation signal from another station through a pretransmission protocol, the drive motor 13 is again activated and a reading operation of the original document 4 is initiated.

(4) As the original document 4 is transported through the reading section and when its trailing edge is detected by the sensor 18, the clutch 5 is again energized so that the next following original document 4 begins to be fed.

(5) When the trailing edge of the first original document 4 has reached a stamp position after moving past the sensor 18, the drive motor 13 is deactivated so that the entire drive system is brought to a halt. And, then, upon completion of receiving a receipt confirmation signal from the other station (approximately 300 milliseconds) and stamping the original document thus read (approximately 300 milliseconds), the drive motor 13 is again set in motion to have the first original document 4 discharged out of the document feeding apparatus. During this time period, the rollers 9 and 10 follow the operation of the drive motor 13.

(6) Then, it returns to step 2.

As may be understood from the above description, since the rollers 9 and 10 follow the operation of the drive motor 13, while the preceding document is temporarily halted because of a transmission completion protocol procedure and a stamping operation, the drive motor 13 must be deactivated. As a result, the feeding operation of the next following document 4 must also be temporarily halted.

SUMMARY OF THE INVENTION

In accordance with the present invention, another electromagnetic clutch is provided on a discharge roller for discharging an original document which has been optically read at the reading section, and the discharging roller is operatively disconnected from the drive system as desired to set the discharging roller in a freely rotating condition. With this structure, even if the preceding document is temporarily halted for a transmission end protocol procedure and a stamping operation, since the discharging roller can be operatively disconnected from the drive system by having the clutch of the discharging roller deenergized, the drive motor can be maintained in operation to thereby allow to transport of the next following document.

It is therefore a primary object of the present invention to obviate the disadvantages of the prior art as described above and to provide an improved document feeding apparatus.

Another object of the present invention is to provide an improved high-speed document feeding apparatus.

A further object of the present invention is to provide an improved automatic document feeding apparatus having a minimized wait time for reading a next following document.

Other objects, advantages and novel features of the present invention will become apparent from the following detailed description of the invention when considered in conjunction with the accompanying drawings.

BRIEF DESCRIPTION OF THE DRAWINGS

FIG. 3 is a timing chart which is useful for understanding the operation of the apparatus shown in FIG. 1; and FIG. 4 is a timing chart which is useful for understanding the operation of the apparatus shown in FIG. 2.

DESCRIPTION OF THE PREFERRED EMBODIMENTS

Figure 1:
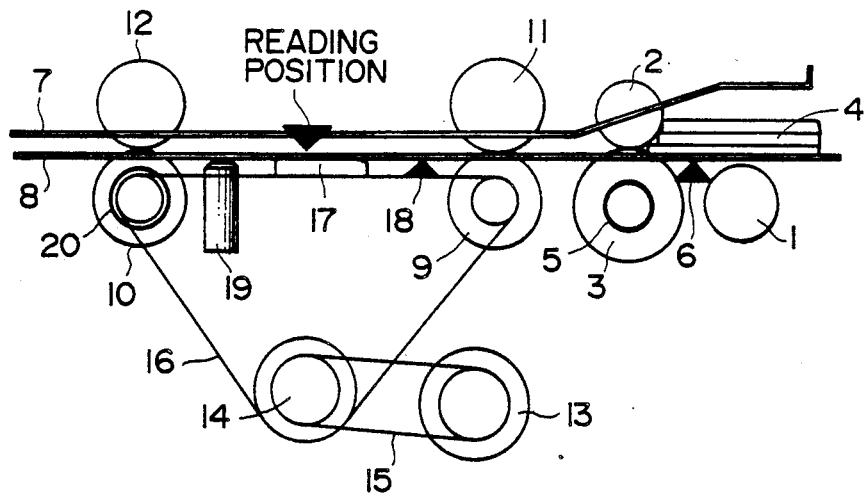
FIG. 1 is a schematic illustration showing a document feeding apparatus incorporated in a facsimile machine constructed in accordance with one embodiment of the present invention.

Referring now to FIG. 1, there is schematically shown a document feeding apparatus incorporated in a facsimile machine constructed in accordance with one embodiment of the present invention. It should be noted that the apparatus shown in FIG. 1 is similar in many respects to the apparatus shown in FIG. 2 and thus similar elements are indicated by similar numerals. In addition, a description set forth above regarding FIG. 2 should also be applicable to the present apparatus shown in FIG. 1 as far as common elements are concerned. The present apparatus shown in FIG. 1 differs from the prior art apparatus shown in FIG. 2 in the additional provision of an electromagnetic clutch 20 in a shaft of the document discharging roller 10 for discharging an original document 4 from the reading section. As a result, the document discharging roller 10 can be set in a freely rotatable condition by having the roller 10 operatively disconnected from the drive system or train including the drive motor 13.

Figure 2:
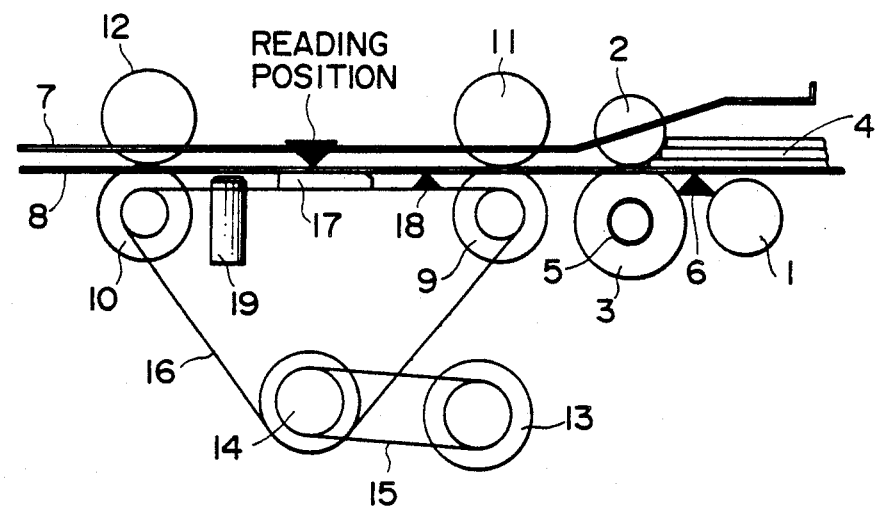
FIG. 2 is a schematic illustration showing a typical prior art document feeding apparatus incorporated in a facsimile machine.

The operation of the present apparatus is similar from step (1) to step (4) set forth above with reference to FIG. 2. In other words, there is no difference in the operation up to the point when the next following original document 4 is about to begin upon completion of reading of the preceding original document 4. Thereafter, in accordance with the present invention, even when the trailing edge of the preceding original document 4 has reached the stamping position after moving past the sensor 18, the drive motor 13 is still maintained in operation as different from the prior art apparatus of FIG. 2 and the clutch 20 is deenergized or turned off to thereby have the document discharging roller 10 operatively decoupled from the drive system or train including the drive motor 13.

As a result, the preceding original document 4 is temporarily brought to a halt since the paper discharging roller 10 is temporarily decoupled from the drive system, and a transmission completion protocol procedure and a stamping operation are carried out. On the other hand, the next following original document 4 is transported along the transportation path, and when its trailing edge has been detected by the sensor 18, a pretransmission protocol procedure can be initiated. In this manner, in accordance with the present invention, since the next following original document can be transported even if the preceding original document is being temporarily halted, the wait time for reading the next following original document is minimized.

As described above, in accordance with the present invention, an electromagnetic clutch is provided on the document discharging roller for discharging an original document from a document reading section so that the document discharging roller can be temporarily decoupled from a drive system or train including a drive motor. Therefore, a document feeding roller for feeding an original document into the reading section can be maintained in operation even if the document discharging roller is temporarily set motionless, so that the next original document may be set ready for a reading operation. Thus, the wait time for reading the next following original document is minimized. In addition, since the document discharging roller is temporarily decoupled from the drive system, the load encountered by the drive system is also relaxed slightly.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A document feeding apparatus, comprising:
   a document feeding roller for feeding an original document into a reading section where an image of said original document is optically read;
   a document discharging roller for discharging said original document from said reading section;
   driving means for driving said document feeding and document discharging rollers;
   clutch means mounted on said document discharging roller for operatively coupling and decoupling said document discharging roller to and from said driving means;
   wherein when said clutch means is temporarily energized, said document discharging roller is operatively coupled to said driving means, and, on the other hand, when said clutch means is deenergized, said document discharging roller is operatively decoupled from said driving means;
   when the discharging roller is halted temporarily, a next original document is transported to an original-document-reading-standby position by means of said document feeding roller;
   said clutch means temporarily deenergized when a stamping operation is to be carried out for the original document which has just been read;
   wherein simultaneously with sending out a transmission termination protocol, the clutch means provided on the discharge roller is deenergized to thereby stop only the discharge roller, and after the stamping operation, the clutch means is energized to have the discharge roller rotate in synchronism with the feed roller.

2. Apparatus of claim 1, wherein said clutch means is an electromagnetic clutch.

* * * * *